US008588529B2

(12) United States Patent
Nykyforov

(10) Patent No.: US 8,588,529 B2
(45) Date of Patent: Nov. 19, 2013

(54) METHOD AND SYSTEM FOR DETECTING TEXT IN RASTER IMAGES

(75) Inventor: Vyacheslav Nykyforov, Littleton, MA (US)

(73) Assignee: Vistaprint Schweiz GmbH, Winterthur (CH)

( * ) Notice: Subject to any disclaimer, the term of this patent is extended or adjusted under 35 U.S.C. 154(b) by 157 days.

(21) Appl. No.: 13/210,184

(22) Filed: Aug. 15, 2011

(65) Prior Publication Data
US 2013/0044945 A1 Feb. 21, 2013

(51) Int. Cl.
*G06K 9/62* (2006.01)
(52) U.S. Cl.
USPC .......................................... 382/187; 382/203
(58) Field of Classification Search
None
See application file for complete search history.

(56) References Cited

U.S. PATENT DOCUMENTS

2004/0151377 A1* 8/2004 Boose et al. ................... 382/193

OTHER PUBLICATIONS

Boris Epshtein et al., Detecting Text in Natural Scenes with Stroke Width Transform, IEEE Publication, Jul. 2010, pp. 2963-2970.*

* cited by examiner

*Primary Examiner* — Brian P Werner
(74) *Attorney, Agent, or Firm* — Jessica Costa

(57) ABSTRACT

Systems, methods, and applications for detection text in a raster image include converting a raster image into a vector representation of the image, identifying pairs of shapes of similar size and within a predefined distance of one another, forming shape graphs from the identified shape pairs, identifying chains of shapes from the formed shape graphs, determining characteristic chain lines associated with the identified chains of shapes, straightening the identified chains of shapes into a straight line based on the corresponding chain lines associated with the respective identified chains of shapes, and classifying the straightened identified chains as text or non-text using an automatic text classifier.

26 Claims, 19 Drawing Sheets

701

702

703

PLANE 0 RASTER

704

PLANE 1 RASTER

705

PLANE 2 RASTER

706

PLANE 0 VECTORIZED

707

PLANE 1 VECTORIZED

708

PLANE 2 VECTORIZED

710

STAGE 3 – GRAPHS –
CHAIN-OPTIMIZED

710

METHOD AND SYSTEM FOR DETECTING TEXT IN RASTER IMAGES

BACKGROUND OF THE INVENTION

The present invention relates generally to image processing, and more particularly to methods, systems, and applications for detecting text in raster images.

Many images (taken by camera or created by an artist) contain text. Text can hold significant information, so the task of detecting and recognizing text (i.e., converting into characters for storing and processing by a computer system) is important. Typical processing steps are: image clean-up (remove noise and reduce the number of colors), detection of text block candidates (blocks of pixels which may represent some text), classification of the candidate blocks into text and non-text, translation of text-like blocks into sequences of text characters (text recognition).

One method for detecting text in images is known as Optical Character Recognition (or "OCR"). Modern commercial OCRs do a very good job of recognizing black-and-white or grayscale text consisting of rectangular text lines of sufficient length. Error rates are very low for even noisy and low-contrast images. However, OCR pre-preprocessing does not perform well on images containing text which is short, curved, or on a busy background. A need therefore exists for an improved method for pre-processing such image, detecting, classifying and straightening text candidate blocks.

SUMMARY OF THE INVENTION

The present invention describes a method for detecting text in raster images, including detecting and preprocessing candidate chains and then classifying the candidate chains as text or non-text. The novel technique for detecting text in raster images, and the systems, methods and applications presented herein applying the novel technique, can detect many previously-undetectable types of text, including text of different colors, text that lies along one or multiple different curve lines, and text of unusual fonts (sometimes even embedded within the architecture of another object).

In an embodiment, a method for detecting text in raster images includes converting a raster image into vector representations of shapes (known as "vectorization") of different colors in the image, identifying pairs of shapes of similar size and within a predefined distance of one another, forming shape graphs from the identified shape pairs, decomposing the formed shape graphs into chains of shapes, determining characteristic chain lines from the identified chains, straightening the identified chains into a straight line based on corresponding chain lines, and classifying the straightened identified chains as text or non-text using an automatic text classifier.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

Figure 1:
FIG. 1 is a set of example images containing text of various colors and sizes and lying along various curved and straight lines.

FIG. 1 depicts several example images that contain text, illustrating a small sample of the variation of fonts, colors, curve lines, and sizes that text may present in an image. As shown, in some cases, a character of the text is not a traditional font (e.g., the heart shape used in place of an "O" in the word "love" in image 103). In some cases, the text is part of the architecture of another object (e.g., the text "If you put a guitar on the t-shirt, everyone will buy it!" forming the body of the guitar in image 102). In still other cases, the text lies along curve lines (e.g., "Praise Cheeses" in image 101 or "Alpha Beta Gamma" in image 104).

Figure 2:
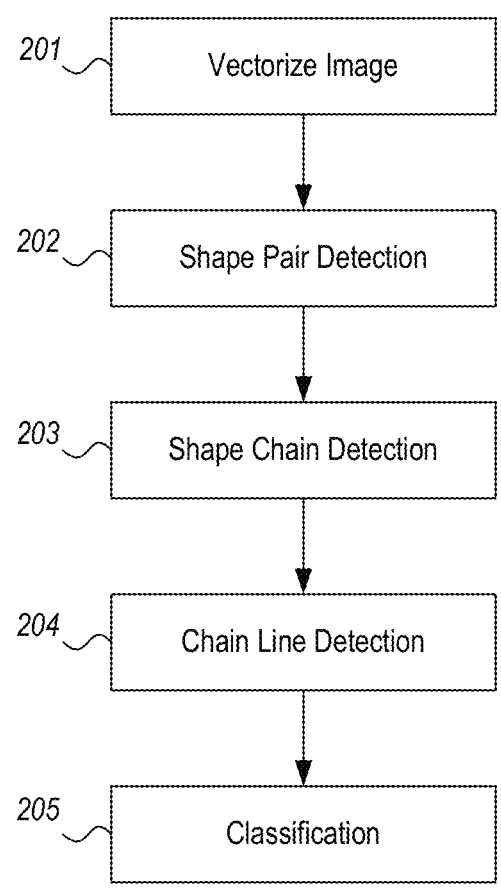
FIG. 2 is a flow diagram illustrating the various stages of an exemplary method and system for detecting text in a raster image.

FIG. 2 is a flow diagram illustrating an exemplary method for detecting text in raster images. In general, the method includes five stages:

Image Vectorization (stage 201), wherein a raster image is vectorized into vector representations of shapes of different colors;

Shape Pair Detection (stage 202) where pairs of shapes of similar size and within a predefined distance of one another are identified;

Chain Detection (stage 203) where chains of shapes are extracted;

Chain Line Detection (stage 204) where line curvature is detected and chains are straightened if need be; and Text Candidate Classification (stage 205) wherein identified text chains are input to a text classifier to generate candidate text corresponding to the identified text chains.

In general, the technique for detecting text in a raster image includes pre-processing the image (i.e., removing noise and converting it to vector representation for easier manipulation and less required computation), followed by detecting, straightening, and classifying text chain candidates in the image.

Figure 3:
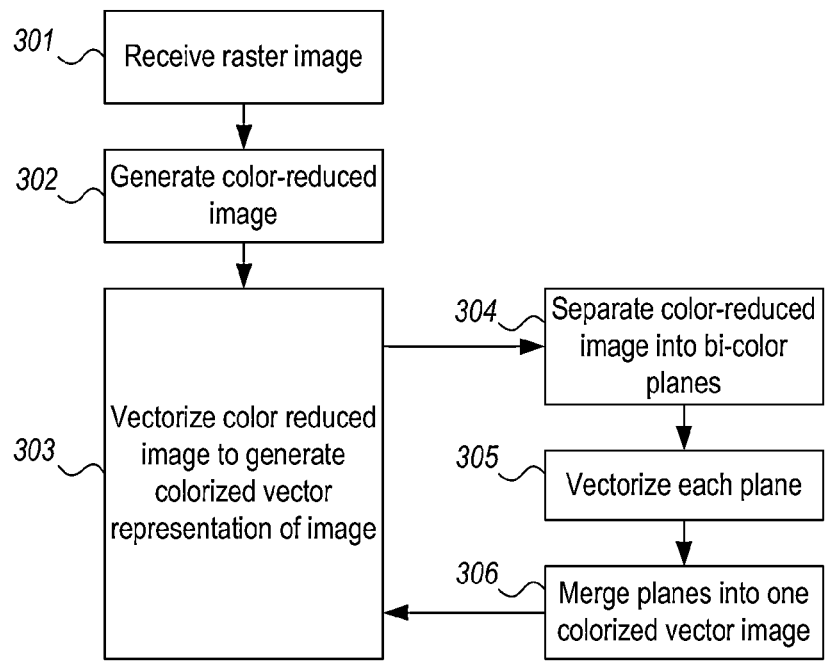
FIG. 3 is a flowchart illustrating an exemplary method for vectorizing a raster image.

Turning now in detail to each of the five stages 201-205, the first stage 201 is a raster-to-vector image conversion to generate a vector representation of the raster image. FIG. 3 is a flowchart illustrating an exemplary method for vectorizing a raster image (i.e., stage 201) in preparation for text candidate detection. As illustrated in FIG. 3, a raster image is received (step 301). An image may contain millions of different colors. The raster image is reduced to a reduced set of colors in a color-reduced image (step 302). Assuming that the color of each character in a string of characters in an image is generally similar (with variations due to lighting, gradations, etc.), the first goal is to identify shapes of similar color in the image. One way to identify shapes of different color is to effectively down-sample the image to a reduced set of discrete colors.

Various techniques exist for reducing the number of colors in an image. In an embodiment, the image is color-reduced using a novel color-reduction technique described in detail in U.S. patent application Ser. No. 13/022,390, entitled "Method and System for Converting an Image to a Color-Reduced Image Mapped to Embroidery Thread Colors", filed Feb. 7, 2011, which is hereby incorporated by reference for all that it teaches. In particular, the color reduction algorithm detailed in the '390 patent application generates a color-reduced raster image from an input image by snapping each pixel in the input image to a nearest color in a predetermined reduced set of colors, and iteratively identifying possible pairs of colors in the color-reduced image and merging at least one identified color pair based on color similarity and edge characteristics until the total number of colors in the color-reduced image reaches or is not greater than predetermined maximum color count. In an embodiment, the predetermined reduced set of colors covers a reduced sampling of the entire color spectrum.

In another embodiment, the image is color-reduced using the well-known Octree color quantization algorithm, as described in numerous articles and publications, including but not limited to the article "Color Quantization Using Octrees", Bloomberg, Dan S., Leptonica, Sep. 4, 2008, and available at http://www.leptonica.org/papers/colorquant.pdf. In Octree quantization, the pixels in a full color RGB (red-green-blue pixel color representation) image are encoded as an octree up to nine levels deep. Octrees are used because $2^3=8$ and there are three color components in the RGB system. The node index to branch out from at the top level is determined by a formula that uses the most significant bits of the red, green, and blue color components, e.g. 4r+2g+b. The next lower level uses the next bit significance, and so on. Less significant bits are sometimes ignored to reduce the tree size. The desired reduced set of colors can be achieved by iteratively pruning bottom-level leaf nodes and merging/rounding the average value of the pruned leaf nodes into their parent node (which then itself becomes a leaf node).

Another well-known color quantization algorithm is known in the art as the Median Cut algorithm. The Median Cut algorithm reduces a full-color RGB image by partitioning the color space into a reduced set of colors, and then mapping each pixel to one of the colors in the reduced set. To obtain the reduced set of colors, the Median Cut algorithm partitions the color space into three-dimensional rectangular regions with substantially equal numbers of pixels in each region. The rectangular regions are repeatedly reduced by dividing selected regions in planes perpendicular to one of the color axes. The region selected to be divided is the region with the most pixels, and the division is made along the largest axis and divided such that substantially half the pixels are left in the divided parts. A more detailed description of the Median Cut algorithm may be found in numerous articles and publications, including but not limited to the article in the article "Color Quantization Using Modified Median Cut", Bloomberg, Dan S., Leptonica, 2008, and available at http://www.leptonica.org/papers/mediancut.pdf.

Any of the above-described or still other color quantization techniques are available as software both commercially and as open-source, and also may be coded and modified by any person of skill in the art.

Figure 7A:
FIGS. 7A-7N together sequentially illustrate the processing of an example image in accordance with the methods described in FIGS. 2, 3, 4, 5, 6A and 6B.
Figure 7B:

FIG. 7A depicts an example raster image 701, and FIG. 7B illustrates a corresponding color-reduced image 702 generated by applying a color-reduction algorithm to the image 701 of FIG. 7A.

Returning to FIG. 3, after the color-reduced image is generated, it is then converted from a raster format to colorized vector format (step 303). A vector format is a set of mathematical statements and/or equations that specify particular primitives (such as points, lines, curves, circles, ellipses, rectangles, etc.) and values of the parameters (such as the radius required by the circle primitive) and/or attributes (such as the fill color) required to draw the primitives. A vector format file is merely a collection of such specified primitives which instruct a rendering program how to draw the specified primitives on a display screen. Vector representation of an image is advantageous for purposes of the present invention because of the ease in calculating certain functions (in a continuous way) relative to the shape boundaries and ability to scale the shape without affecting the smoothness of the boundary. As will become clearer in the description of the later stages in the text detection method, it will be important to have the ability to calculate normals and other functions based on a smooth continuous boundary (as represented in vector images) rather than against rough jagged boundaries such as found in raster images due to square pixels forming edge boundaries. In addition, these functions must often be calculated after scaling a particular shape, so the boundaries must appear smooth regardless of the size of the given shape.

Raster-to-vector conversion is well-known and there are numerous commercial (e.g., but not limited to: RxRaster manufactured by Rasterex Softwar, AutoVector manufactured by Caricature Software, CoreIDRAW manufactured by Corel, Illustrator manufactured by Adobe Systems, GTXRaster CAD Series manufactured by GTX Corporation, etc.) and open-source software packages (e.g., but not limited to: AutoTrace created by Martin Weber, BMP2SVG manufactured by Accelerated I/O, Potrace created by Peter Selinger, Ras2Vec created by Davide Libenzi, Image2XAML created by Roman Kalachik, etc.) that will perform the conversion. Some raster-to-vector conversion packages convert a raster image to a colored vector-representation of the image—that is, the colors of the shapes are retained as shape attributes. Other raster-to-vector conversion packages, such as Potrace, input and output only bi-color images (e.g., black-and-white, or some other combination of two colors). Thus, if a colorized vector image is desired, the color image is decomposed into separate channels (one for each color in the image) (step 304), and a corresponding bi-color vectorized image is generated for each channel (step 305). The bi-color vector image for each channel are then merged (adding in the color attribute for each shape) into one colorized vector image (step 306). The resulting image is a colorized vector image.

Figure 7C:
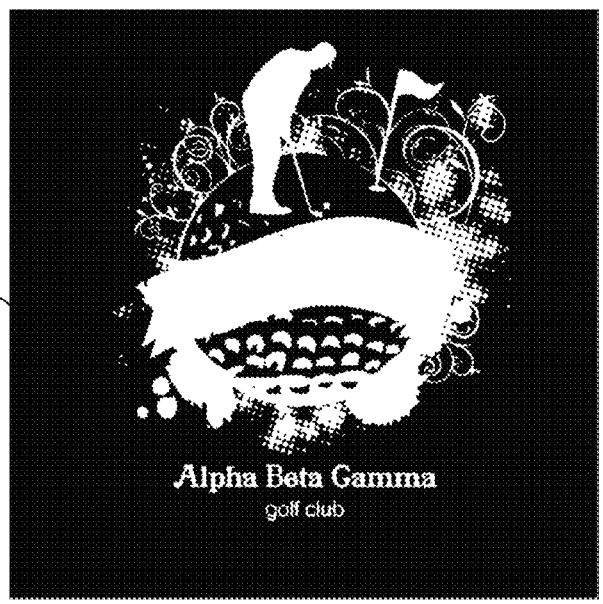
Figure 7C:
Figure 7C:
Figure 7D:
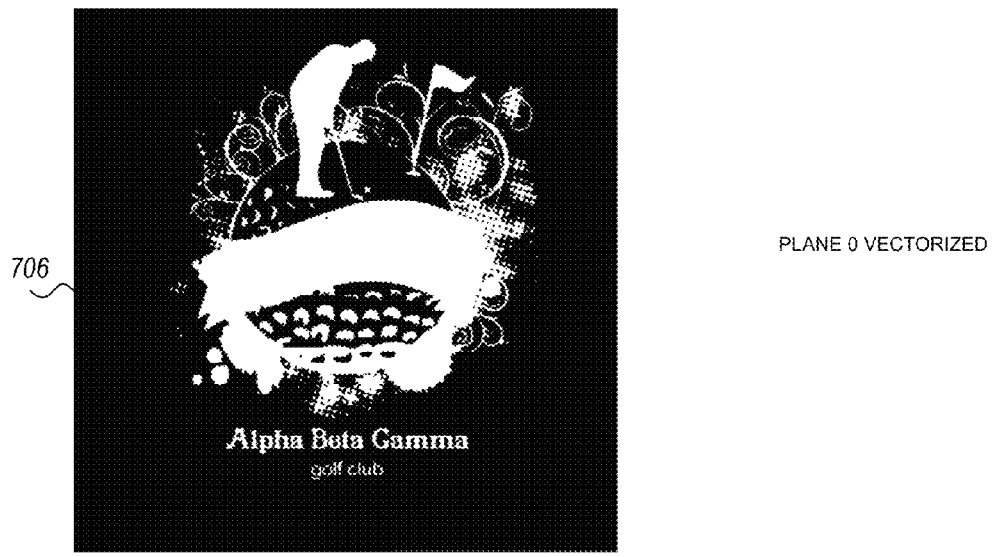
Figure 7D:
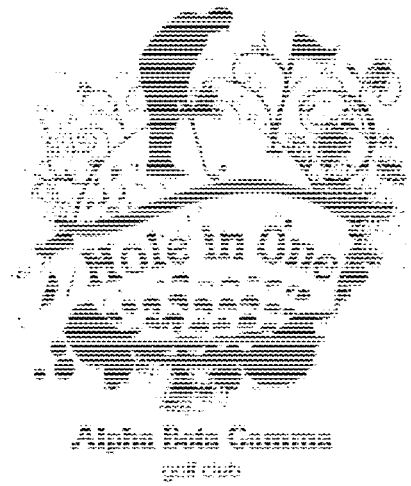
Figure 7D:

FIG. 7C illustrates the raster representation of each color channel of the color-reduced image 702 of FIG. 7B. The color-reduced image 702 is reduced to three colors—white, green, and yellow. FIG. 7C shows the resulting white channel image 703, green channel image 704, and yellow channel image 705 when the color-reduced image 702 is decomposed by color channel into black-and-white (or bi-color) planes. As shown, all pixels which correspond to the color "white" are set to "1", and all other pixels are set to "0". Pixels set to "1" appear as black, and pixels set to "0" appear as white in the white channel raster image 703. Similarly, in the green channel plane, all pixels which correspond to the color "green" are set to "1", and all other pixels are set to "0". Pixels set to "1" appear as black, and pixels set to "0" appear as white in the green channel raster image 704. Likewise, in the yellow channel plane, all pixels which correspond to the color "yellow" are set to "1", and all other pixels are set to "0". Pixels set to "1" appear as black, and pixels set to "0" appear as white in the yellow channel raster image 705.

Figure 7E:
Figure 7E:
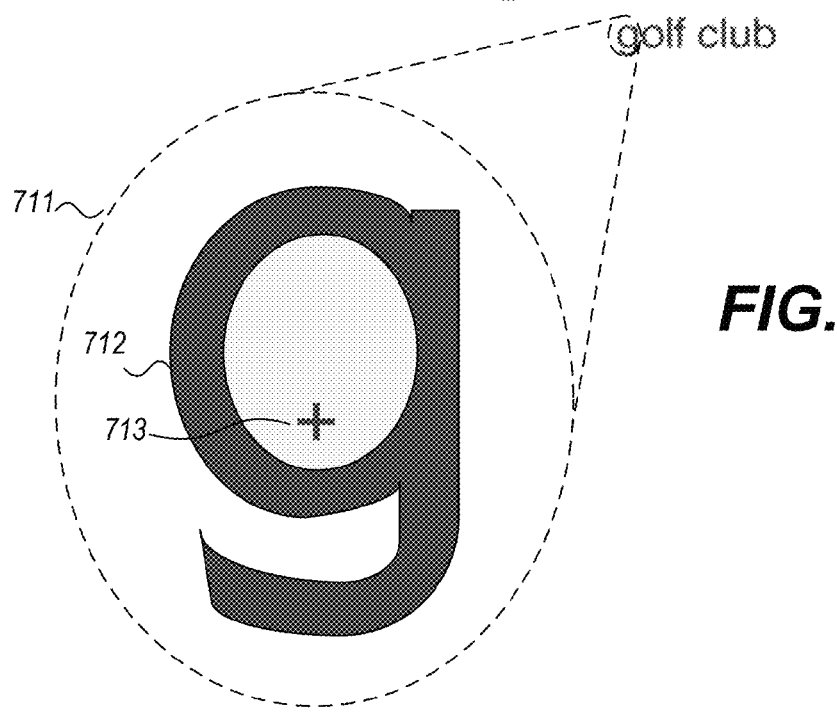

The raster images 703, 704, and 705, corresponding to each color channel are then converted to a vector representation of the corresponding raster image to generate corresponding vector images 706, 707, 708 for each color channel. The file for each vector image 706, 707, 708, contains the vector description for drawing only those shapes in the overall image that correspond to the color of the respective color channel. The vector image files corresponding to the respective color-channel vector images are then merged into a single vector format file, adding in color attributes of each of the shapes (if necessary to the particular implementation), to generate a composite colorized vector image 709, as illustrated in FIG. 7E.

Figure 4:
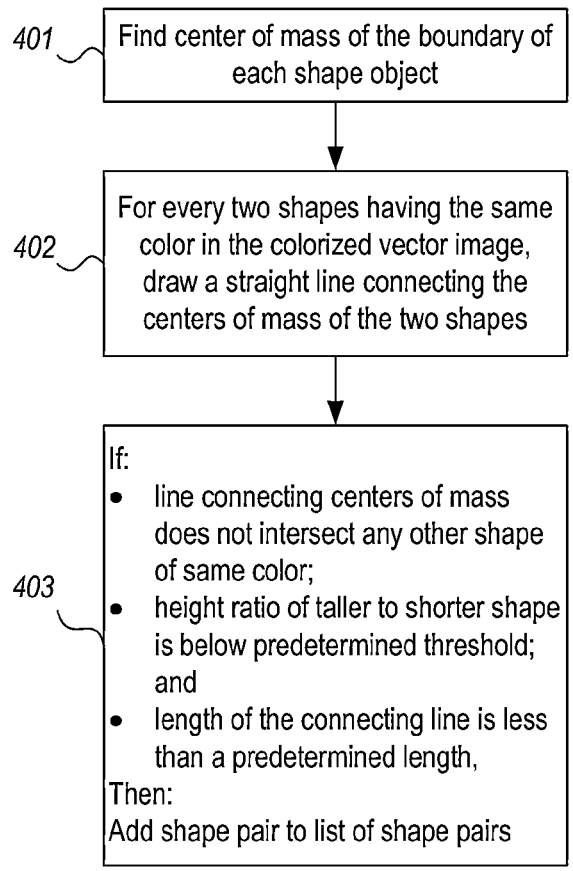
FIG. 4 is a flowchart illustrating an exemplary method for detecting pairs of shapes in each color plane.

Moving next to stage 202 of FIG. 2, the method identifies pairs of shapes of similar size and color within a predetermined distance of one another within the colorized vector image 709. FIG. 4 is a flowchart illustrating an exemplary method for detecting pairs of shapes in a colorized vector image. In an embodiment, for every two shapes in each color plane a shape pair is created if the following conditions are met:

the straight line connecting the perimeter centers of mass does not intersect any other shape in the colorized vector image;

the height ratio of the taller to shorter shape is below certain threshold (e.g., but not limited to 2—i.e., the taller shape is at most twice as tall as the shorter shape), wherein the height is measured orthogonal to and relative to the connecting line; and the length of the connecting line is less than a predetermined length (e.g., but not limited to, 1.4*(average height of the two shapes)).

To determine whether shapes are of similar size, it is best to define a measure that is independent of, or at least as close as possible to independent of, the rotation of the image. This is important, since text can potentially lie along a curve, or be rotated to any angle relative to conventional horizontal. In the novel method described herein, the measure used shall be the shape boundary's center of mass, hereinafter referred to as the "shape perimeter center of mass", or simply "center of mass". The center of mass is used because, as shall be clearer later in the description, the maximum distance between the center of mass of the shape and its most extreme outer boundary varies least with rotation of the shape versus other possible centers of rotation.

Figure 7F:
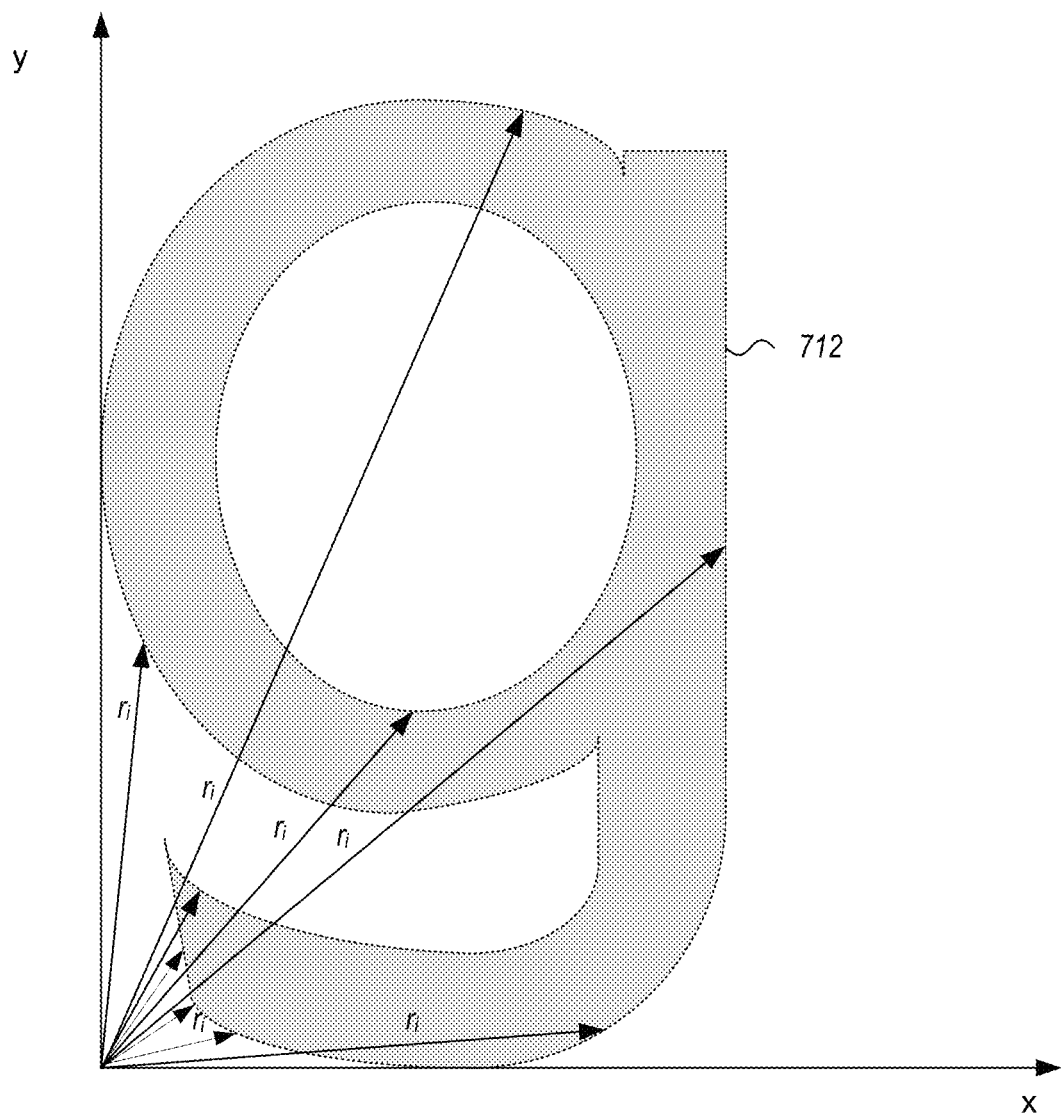

Referring now to FIG. 7F, one can find the shape perimeter center of mass by considering each shape boundary point as an individual point mass. The center of mass R of a shape boundary made up of a number, i, of equidistant points, is defined as the average of their positions, $r_i$, weighted by their masses, $m_i$: where the point masses, $m_i$, are equal.

$$R = \frac{\Sigma m_i r_i}{\Sigma m_i}.$$

Thus, the perimeter center of mass may not correspond to any given point on the perimeter, and may not even lie within the shape boundary. FIG. 7F illustrates the determination of the positions, $r_i$, for a few example points on the boundary of shape 712 extracted from the image 709 of FIG. 7E. The resulting center of mass is indicated in FIG. 7E at 713 (marked with a "+").

Given the center of mass, a height may be defined for each shape as the size of the shape in the direction orthogonal to the connecting line. The center of mass and height can be used to classify the size of a shape.

Shape pairs are identified as those shapes in an image that are of similar size, same color, and within a predetermined (but preferably configurable) distance of one another. FIG. 4 shows an exemplary method for identifying shape pairs. As indicated in FIG. 4, the center of mass of the shape boundary is found for each shape object in each color plane (step 401). Then, for every two shapes having the same color in the colorized vector image 709 (FIG. 7E), a straight line is drawn connecting the centers of mass of the two shapes (step 402). Then, if the conditions set forth above are met (i.e., (1) the line connecting the centers of mass does not intersect any other shape of the same color in the colorized vector image; (2) the height ratio of the taller shape to shorter shape is below a predetermined threshold; and (3) the length of the connecting line is less than a predetermined length), the shapes are added as a shape pair to a list of shape pairs (step 403). The result is a list of shape pairs of the same color that are of similar size and positioned in relative close proximity (as defined by the parameters such as the predetermined height ratio threshold and predetermined connecting line length).

Moving next to stage 203 of FIG. 2, the shape pairs are organized into one or more chains of shapes that could be text (these chains are also referred to herein as "text candidates"). There is some apriori information we know about text: (1) text characters can only be connected in series—that is, each text character in a word can only be connected at most to one preceding character and at most to one succeeding character; (2) the text characters in any given text chain are typically all of the same color; and (3) chains of text generally do not overlap one another—this makes for difficult reading. Thus, in order to identify the most likely text candidates from the set of shapes, it is convenient to generate one or more connected graphs while applying the apriori information identified above, and then to apply an energy minimization technique to each graph to generate the set of text candidate chains.

In an embodiment, the chain energy consists of the following "energies":

$E_{length}$—Length energy (stimulates chain growing—the longer the chain, the better the text candidate)

$E_{Height\ Variance}$—Height Variance energy (prefers grouping shapes with similar heights)

$E_{curvature}$—Curvature energy (prefers grouping shapes on a line with more or less constant curvature—i.e., along a straight line or predictable curve)

Figure 5:
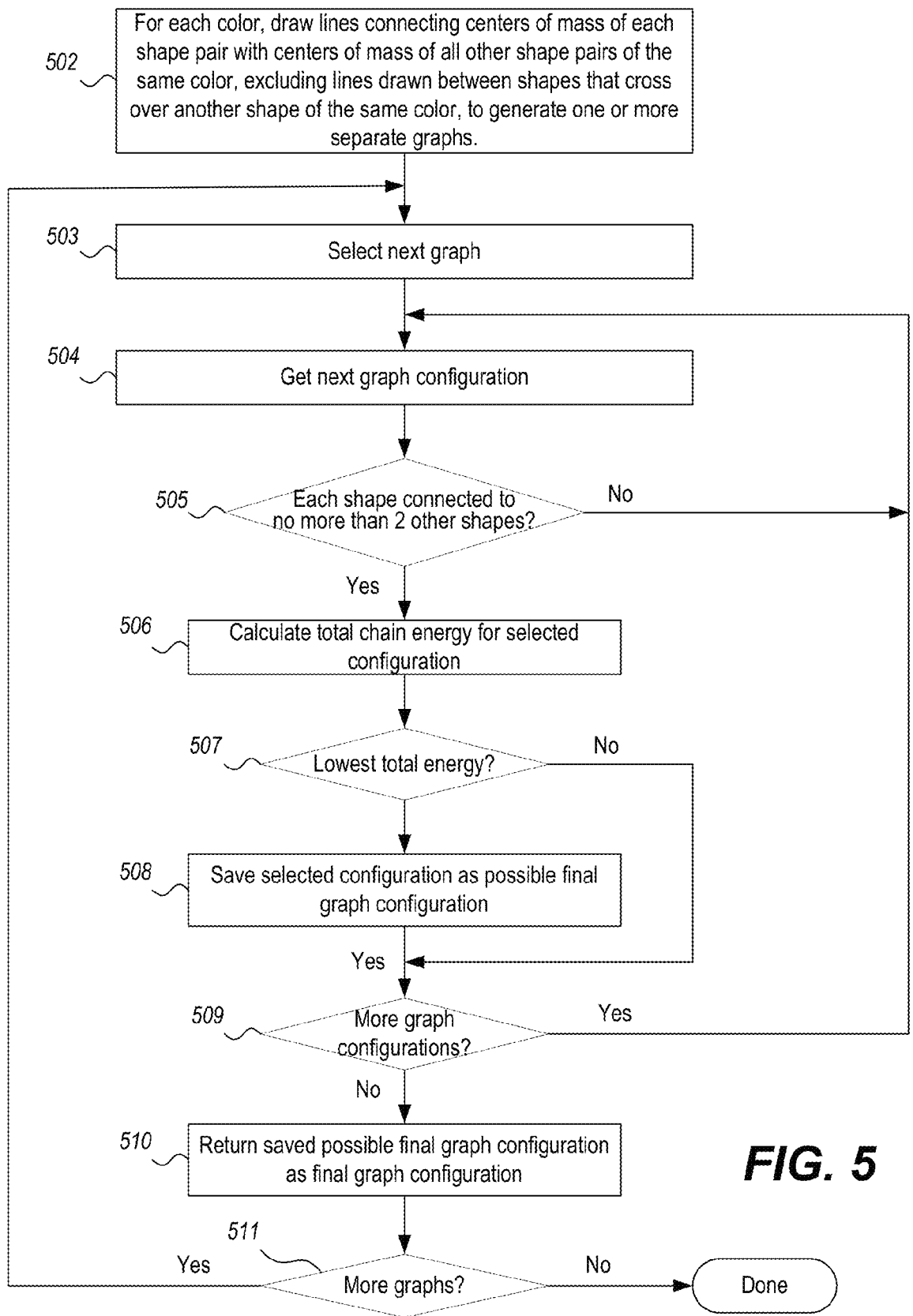
FIG. 5 is a flowchart describing an exemplary method for extracting possible text candidate chains in the image.

FIG. 5 is a flowchart illustrating an exemplary embodiment of a method for identifying the text candidate chains from the shape pairs. As illustrated, for each color, lines are drawn between the centers of mass in each shape pair to the centers of mass of all other shape pairs of the same color with the following exception: a connecting line between two shapes is not drawn if such connecting line will cross over another shape of the same color (step 502). The result of step 502 is a set of one or more separate connected graphs—the shapes are the vertices of the graph and the pairs are the edges.

Once the connected graphs are identified (step 502), the system then takes each graph at a time (step 503), and analyzes every configuration of the graph (by selectively turning on and off the edges in the graph to generate every permutation of on/off edges). In a graph of N edges, there are $2^N$ different configurations. For each graph configuration (step

504, step 509), the system checks to see if each vertex (i.e., shape) in the configuration is connected to no more than two other shapes (step 505). If not, the system considers the graph configuration invalid for purposes of chaining, and moves on to the next edge configuration. If so, however, the system then calculates the individual chain energies (i.e., $E_{length}$, $E_{Height\ Variance}$, $E_{Curvature}$) for the respective graph configuration. The total chain energy of any given graph configuration is then calculated as the sum of each of the individual energies calculated for the associated configuration of the graph—i.e., $E_{Total} = E_{length} + E_{Height\ Variance} + E_{Curvature}$) (step 506). The graph configuration having the lowest total chain energy may be selected as the graph configuration representing a text candidate (step 507/508/510). If more than one graph configuration has particularly low total energy, each such configuration can be considered as a possible text candidate for the next stage. The process is repeated for each graph (step 511).

In the illustrative embodiment, the extraction of text candidate chains from each connected graph is essentially the solution to a "chain energy" minimization problem. In and embodiment, the chain energy is minimized by turning each edge ON and OFF ($2^N$ possible states) using Simulated Annealing, a well-known algorithm for solving many energy minimization problems in systems with large number of possible states. Because Simulated Annealing is non-deterministic, however, it can return a suboptimal solution (such as a local maximum or minimum). To increase the chances of finding the "best" solution (i.e., the global maximum or minimum, which is more likely to be a text chain), a few trials may be performed and the best solution chosen.

Figure 7G:
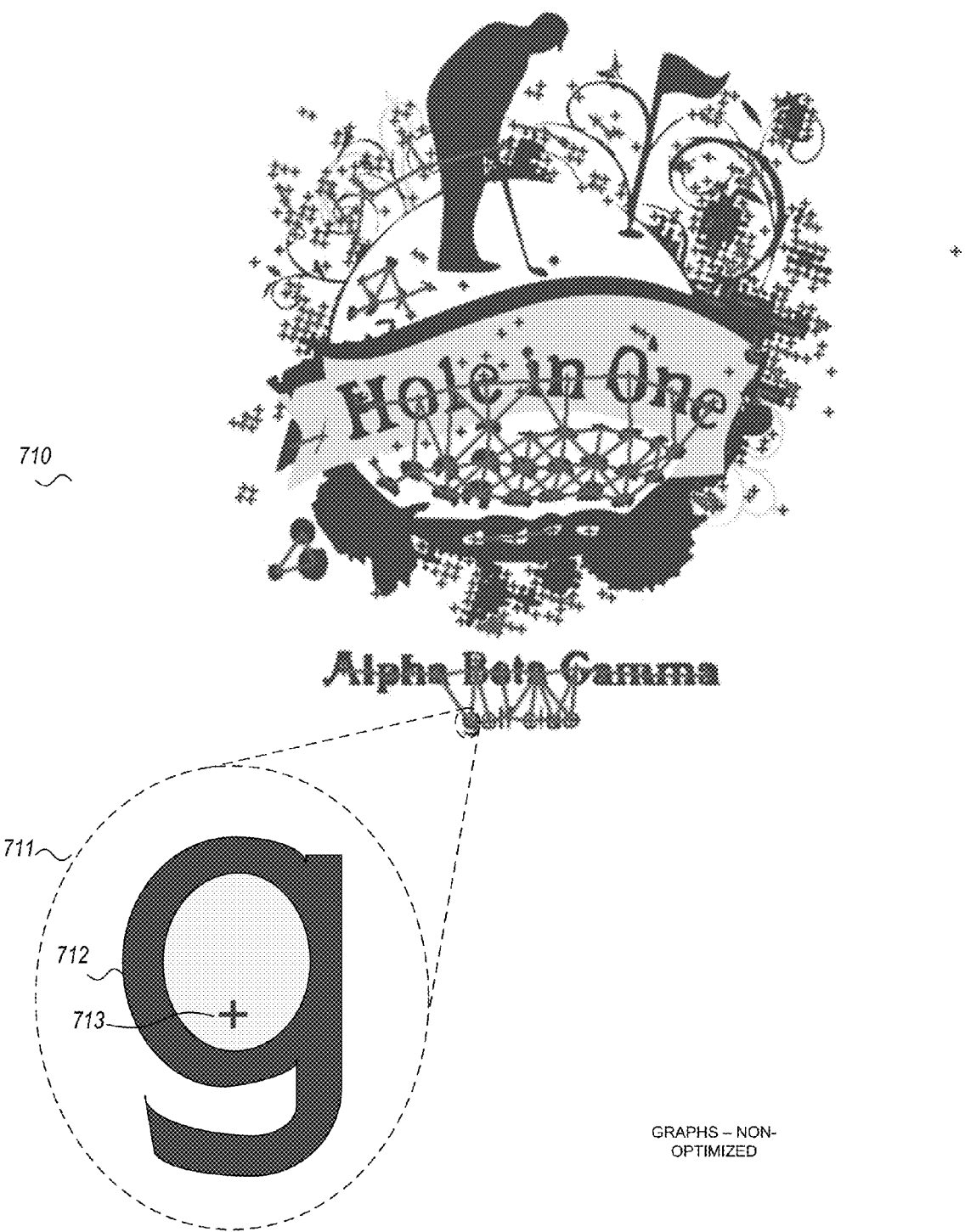
Figure 7H:

The output of stage 203 is a set of one or more separate shape chains which will be treated as text candidates for later classification. FIG. 7G shows an example of the identified graphs for the image 701 of FIG. 7A, and FIG. 7H shows the candidate text chains resulting from application of the method of FIG. 5.

Figure 7I:
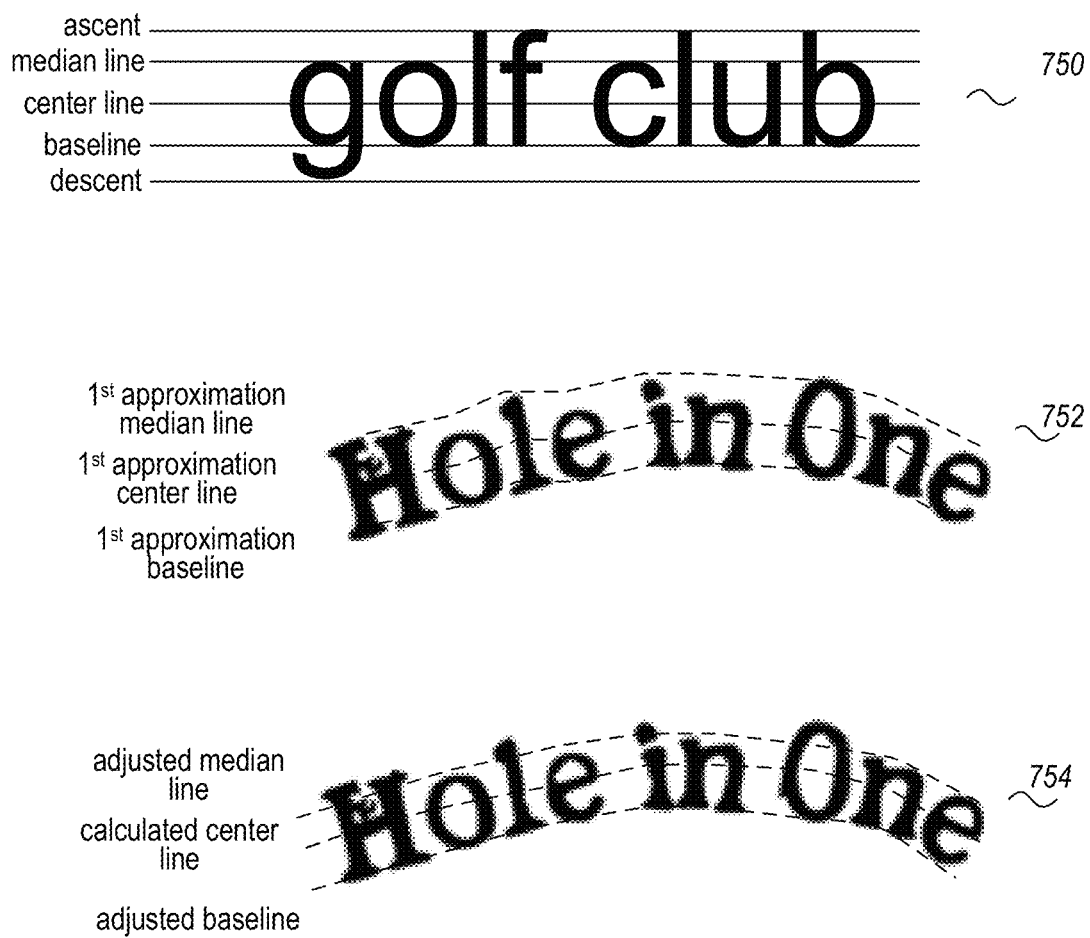

Moving to the next stage 204 in the text detection pipeline (of FIG. 2), chain lines are detected which will be used in order to "straighten" the text candidate for easier classification in stage 205. A "chain line" is the path the shapes take along the chain from one shape to the next. Referring to FIG. 7I, and in particular element 750 which represents a text chain set for printing in a horizontal line, for any given line (straight or curved) of text, there is a baseline (the line upon which most letters "sit" and below which descenders of descending lowercase letters extend) and a mean line (the line where non-ascending lowercase letters terminate). A center line, may be defined as the midline between the base and mean lines. For ease of description, the base, mean, and center lines are together referred to as the "characteristic lines". In a typical printed page, the characteristic lines of the text generally follows a straight line path. In graphics, creative arts, and photographs, text may flow along a curved path. The goal in stage 204 is to find the "characteristic" lines (including the real base, median, and center lines) of each chain, which will ease in straightening the chain for later classification.

Figure 6A:
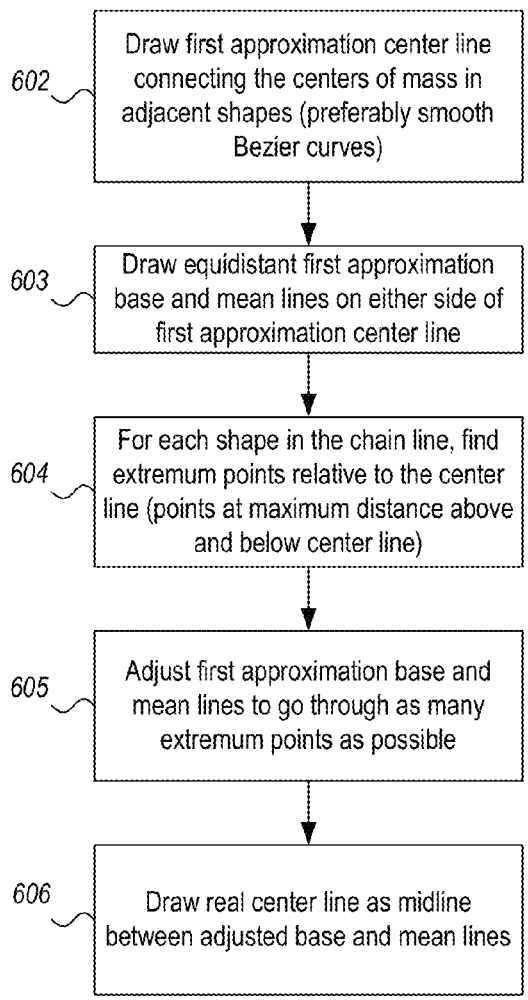
FIG. 6A is a flowchart describing an exemplary method for determining the characteristic lines of the extracted chains.
Figure 7J:
Figure 7K:

FIG. 6A is a flowchart describing an exemplary method for determining the characteristic lines for a given chain. For a given chain, the system draws a first approximation center line connecting the centers of mass in adjacent shapes (step 602). This line is a first approximation to the "real" center line, which will be determined in subsequent steps. Typically, the first approximation center line is not a straight line since the centers of mass of the different shapes are generally in different positions relative their respective shape. In an embodiment, instead of drawing straight lines between the centers of mass, the system draws smooth lines using b-spline interpolation to generate a line of Bezier curves. The system then calculates the average height of all the shapes in the chain, and uses this height to draw equidistant base and mean lines (first approximation for base line and median line) on either side of the first approximation center line (step 603). The distance between the first approximation center line and the first approximation base line, and between the first approximation center line and the first approximation mean line, is half the average height of the shapes in the chain. The system then finds the extremum points of each shape (step 604). Extremum points are those points on the shape located at either a locally or globally maximum distance above and below the center line. The base line is then adjusted in terms of height (i.e., distance from first approximation center line) such that it touches as many extremum points below the center line as possible (step 605). Similarly, the mean line is adjusted in terms of height (distance from first approximation center line) such that it touches as many extremum points above the center line as possible (step 605). The real center line is then determined as the midpoint line between the adjusted base line and adjusted mean line (step 606). The resulting real center line and adjusted base and mean lines are the "real" characteristic lines of the chain. FIG. 7I, element 752, illustrates a first approximation of the characteristic lines for the text chain element 750, and element 754 illustrates the chain with the "real" characteristic lines calculated using the method in FIG. 6A and applied to the chain 750. FIG. 7J shows the image 710 with the first approximation characteristic lines applied, and FIG. 7K shows the image 710 with the final calculated characteristic lines applied.

Figure 6B:
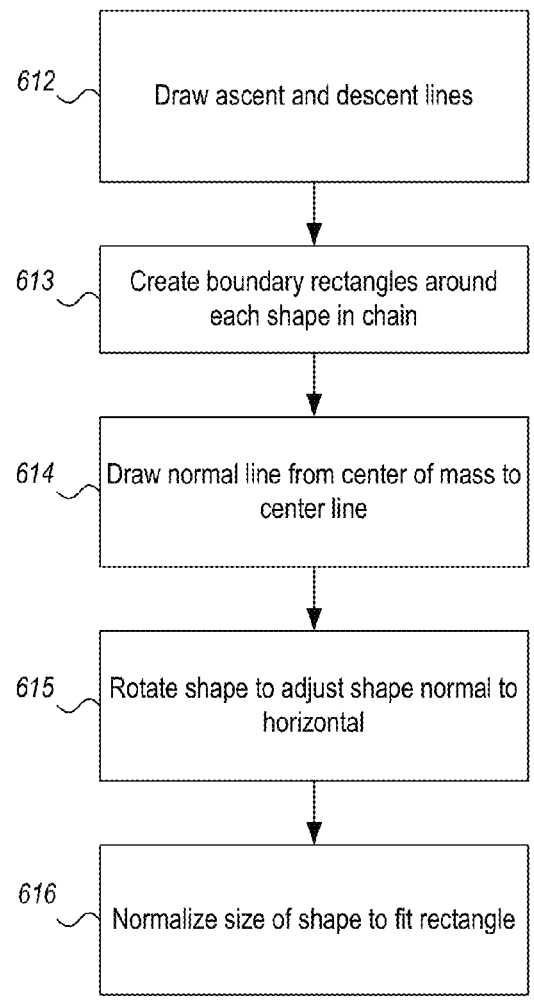
FIG. 6B is a flowchart describing an exemplary method for "straightening" chains.
Figure 7L:
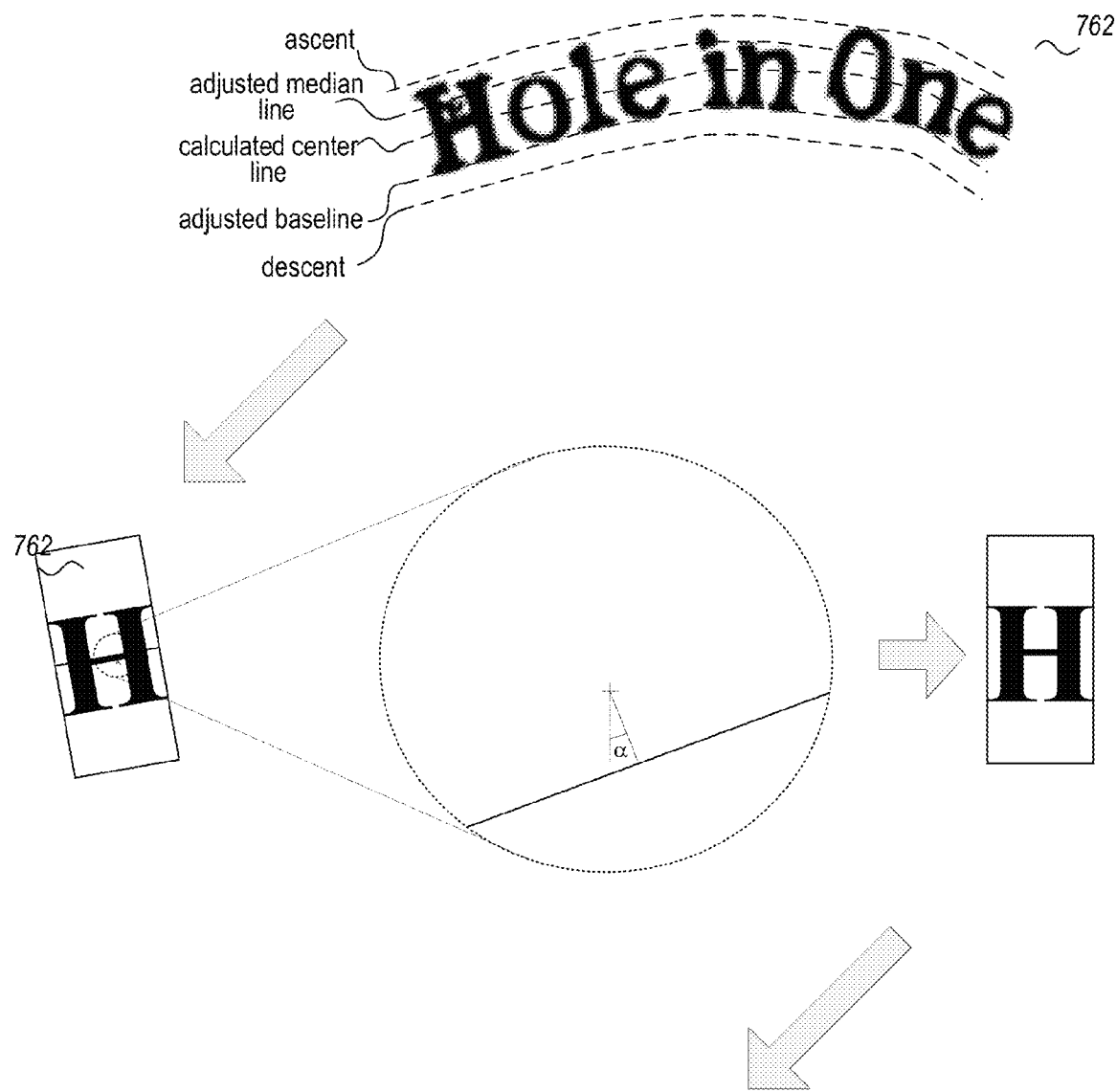

Once the characteristic lines of each chain is determined, the chains of shapes are then straightened to make it simpler for the text classifier to classify the text. Referring to FIG. 6B, ascent and descent lines are drawn above and below the adjusted mean and base lines (step 612). The ascent and descent lines, as illustrated in FIG. 7L, are equidistant from the calculated center line and the distance between the ascent and descent lines is twice the height of the distance between the mean and base lines. A boundary rectangle, also illustrated in FIG. 7L, is created around each shape in the chain (step 613), where the boundaries of the rectangle 762 touch the ascent and descent lines and width boundaries of the shape. For each shape in the chain, the system then draws the normal line (perpendicular to the center line) between the shape center of mass and the center line (step 614). The shape is then rotated by the angle, α, between the normal line and the horizontal normal (that is, the normal line for a horizontal line—i.e., a vertical line), as illustrated in FIG. 7L. The height of the entire chain gets normalized so that the distance between the base and mean lines are equal to a predetermined fixed value. The total height of the straightened chain is two times the predetermined fixed value (so that all shapes fit inside the rectangle).

Figure 7M:
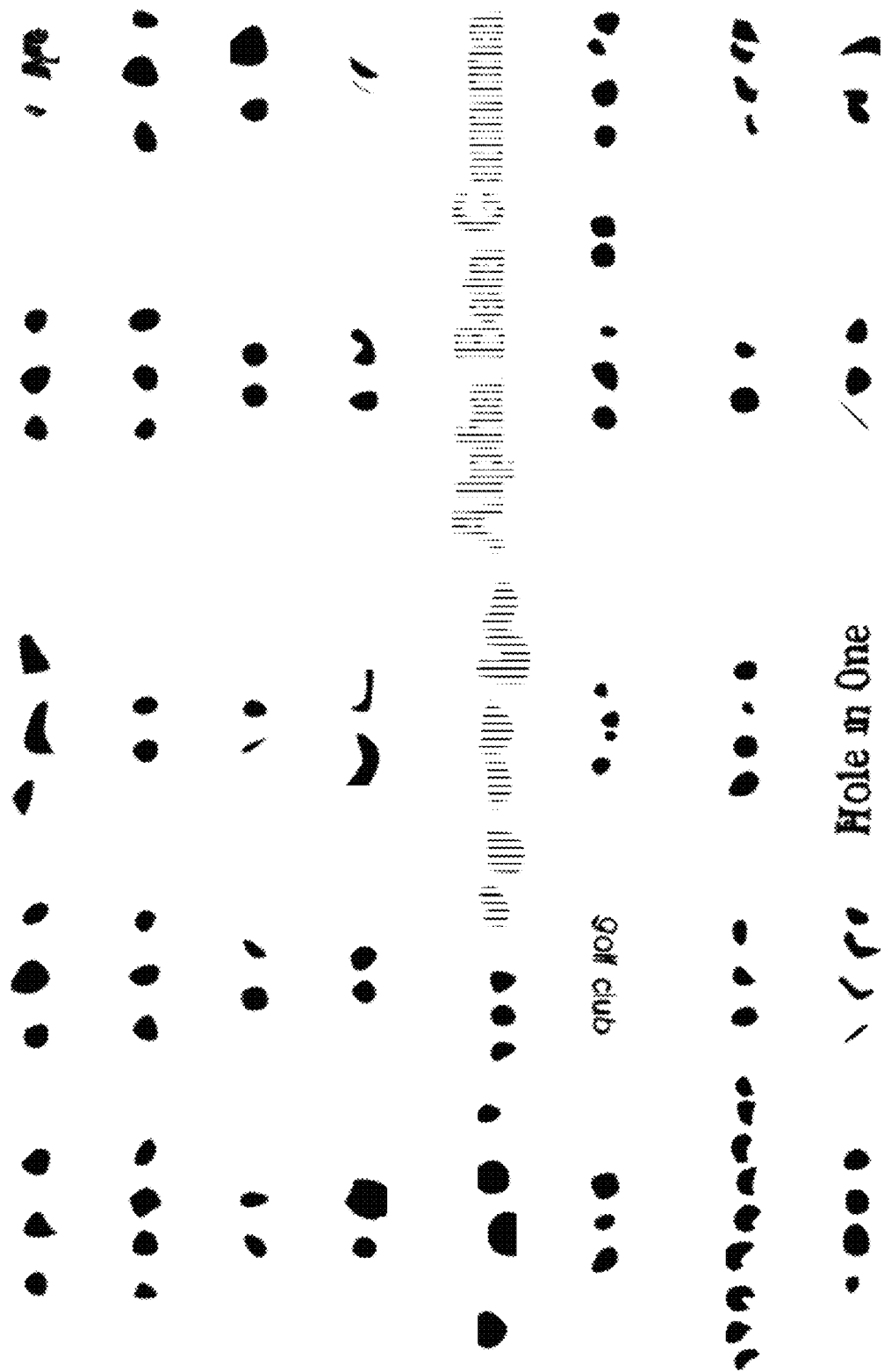
Figure 7N:

The method in FIG. 6B is performed for each shape in the chain to generate a final "straightened" chain. The straightened chain is then rasterized and is ready for input to a classifier. FIG. 7M shows the set of rasterized shape chains ready for input to a classifier, and FIG. 7N illustrates the image 710 indicating the successfully classified chains (i.e., those chains with characteristic lines applied are the successfully classified chains).

Given a set of straightened text chains at the output of stage 204, in stage 205 the system inputs the chains to a text classifier. In a preferred embodiment, the text classifier is an artificial neural network that is trained with a training data set to distinguish text from non-text chains. Artificial neural networks are well-known in the art, and are data processing systems which are trained (or learn) based on a set of training data which includes data and corresponding classifications. Following training, data whose classification is unknown at input, may be submitted to the artificial neural network which will classify the unknown data into one of its learned classifications. If the neural network is trained well, the neural network can receive data it has not seen before and yet still classify the unknown data with high classification accuracy.

As will be appreciated from the detailed description set forth above, the text detection technique can be advantageously applied in systems, methods, and applications to detect text of all sizes, fonts, and colors, including text that lies along one or multiple different curve lines, and text of unusual fonts (sometimes even embedded within the architecture of another object), in a complex image such as line art, creative graphic, or photographic images. The above described text detection technique may be advantageously utilized in a multitude of different applications.

In one embodiment, a system implements text detection in order to detect and filter images that contain text that is too small to print, display, etch, embroider, engrave, or otherwise physically embody. For example, the system could be used to receive images that will be converted to an embroidery pattern. Embroidered images containing text appear best when the text and font are large and without too much detail. In one application, the text detection system may be employed to filter images that are unsuitable for embroidery by detecting text that is too small to embroider.

Figure 8:
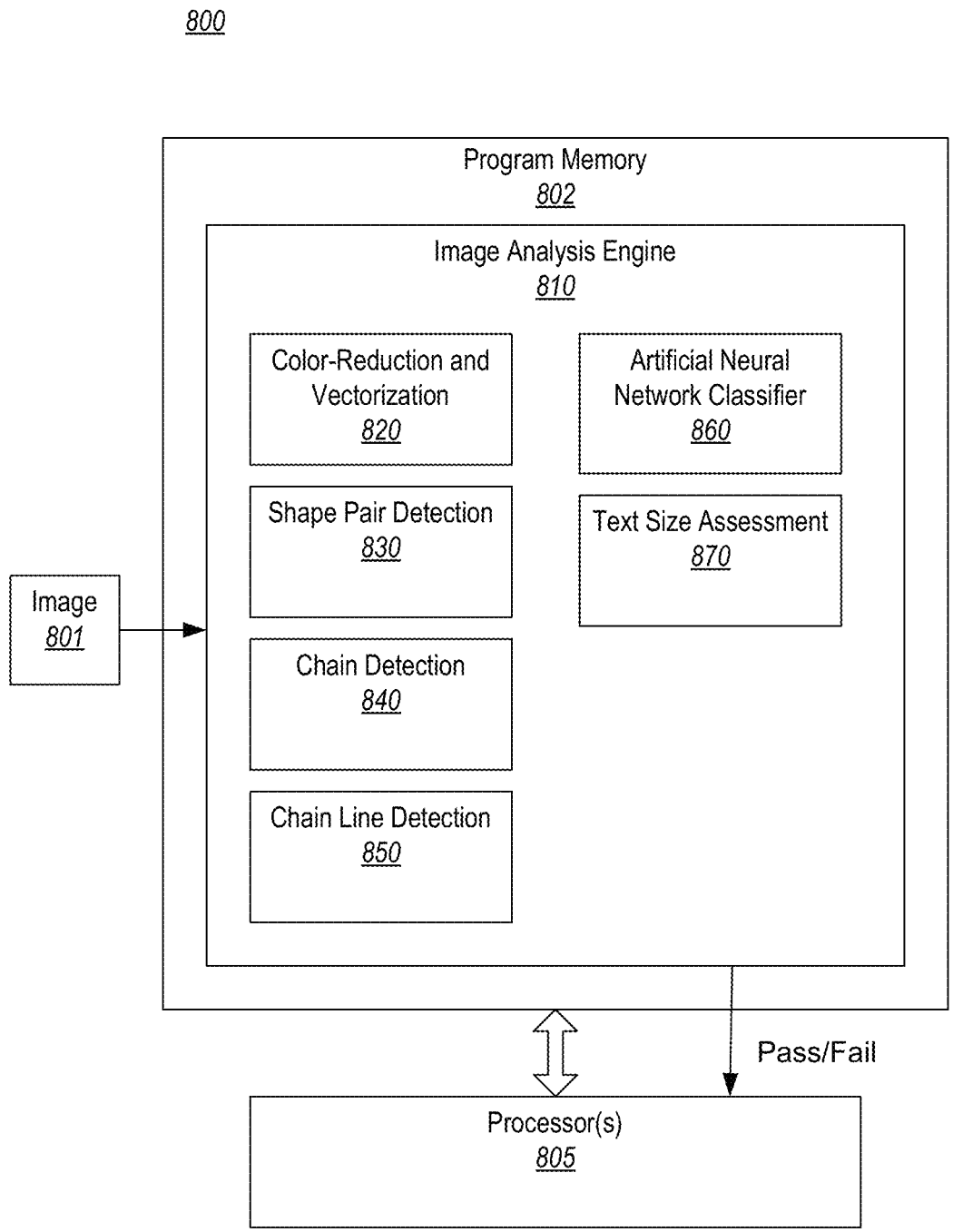
FIG. 8 depicts a system that receives images for conversion to an embroidery pattern and for automatically detecting the suitability of a received image based at least on whether it contains text that is too small.

FIG. 8 depicts a system 800 that receives images for conversion to an embroidery pattern and for automatically detecting the suitability of a received image based at least on whether it contains text that is too small to look good when embroidered. As depicted therein, the system 800 includes one or more processors 805, non-transitory computer readable program memory 802 which stores program instructions which, when executed by the processor(s) 805, implements an image analysis engine 810 which processes an input image 801, determines whether or not the image contains text, and then determines whether or not the image is suitable for conversion to an embroidery pattern based at least on whether the size of the text is too small to look good when embroidered.

In an embodiment, includes a color-reduction and vectorization function 820, a shape pair detection function 830, a chain detection function 830, a chain line detection function 840, an artificial neural network classifier 860, and a text size assessment function 870. The color-reduction and vectorization function 820 converts a raster image to a set of vectorized bi-color plane images, for example in accordance with, but not limited to, the method described in connection with FIG. 3. The shape pair detection function 830 extracts a set of shape pairs of the same color and similar sizes and within a predetermined distance of one another, for example in accordance with, but not limited to, the method described in connection with FIG. 4. The shape chain detection function 840 looks for and identifies chains of shape pairs, for example in accordance with, but not limited to, minimizing the chain energy. The chain line detection function 850 looks for and identifies chains of shape pairs, for example in accordance with, but not limited to, the method described in connection with FIG. 5.

The image analysis engine 810 receives a raster image 801, requests the color-reduction and vectorization function 820 to convert the image to a set of vectorized color planes, and then requests the shape pair detection function 830 to detect similar sized shapes of the same color within a predetermined distance of one another. Given the identified shape pairs, the image analysis engine 810 then requests the chain detection function 830 to identify chains of shape pairs. The image analysis engine 810 requests the chain line detection function 840 to determine the lines (straight and/or curved) of each chain pair and then straighten the chain based on the chain line. The image analysis engine 810 submits the straightened chains to the artificial neural network classifier 860, which classifies the chains as text or non-text. When a text chain is classified as text, the text size assessment function 870 determines whether the size of the text in the text chain meets or exceeds minimum size thresholds. If all detected text meets or exceeds the text size thresholds, the image analysis engine indicates that the image passes (at least in terms of text size); otherwise, the image analysis engine 810 indicates that the image fails (i.e., the image contains text that is too small for embroidery).

Those of skill in the art will appreciate that the inventive systems, methods, applications and features described and illustrated herein may be implemented in software, firmware or hardware, or any suitable combination thereof. For purposes of lower cost and flexibility, software implementation for many of the features may be preferred. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A method for detecting text in raster images, the method comprising the steps of:
   converting a raster image into a vector representation of the image;
   identifying pairs of shapes of similar size and within a predefined distance of one another;
   forming shape graphs from the identified shape pairs;
   identifying chains of shapes from the formed shape graphs;
   determining characteristic chain lines associated with the identified chains of shapes;
   straightening the identified chains of shapes into a straight line based on the corresponding chain lines associated with the respective identified chains of shapes; and
   classifying the straightened identified chains as text or non-text using an automatic text classifier.

2. The method of claim 1, wherein the vector representation of the image is a colorized vector representation of the image.

3. The method of claim 1, wherein the step of converting the raster image into a vector representation of the image comprises:
   receiving the raster image;
   converting the received raster image into a color-reduced raster image;
   vectorizing the color-reduced raster image to generate the colorized representation of the raster image.

4. The method of claim 3, wherein the step for converting the received raster image into a color-reduced raster image comprises down-sampling the received raster image to a reduced set of discrete colors.

5. The method of claim 3, wherein the step for converting the received raster image into a color-reduced raster image comprises setting corresponding pixel colors of pixels in the received raster image to a nearest color in a predetermined reduced set of discrete colors.

6. The method of claim 3, wherein the step for converting the received raster image into a color-reduced raster image comprises applying an Octree color quantization algorithm to the received raster image to generate a down-sampled version of the received raster image having pixels corresponding only to a reduced set of discrete colors.

7. The method of claim 3, wherein the step for converting the received raster image into a color-reduced raster image comprises applying Median Cut color quantization algorithm to the received raster image to generate a down-sampled version of the received raster image having pixels corresponding only to a reduced set of discrete colors.

8. The method of claim 3, wherein the vectorizing step comprises:
   decomposing the color-reduced image into separate bi-color planes; and
   vectorizing each bi-color plane.

9. The method of claim 8, wherein the step for identifying pairs of shapes of similar size and within a predefined distance of one another comprises:
   identifying two shapes of the same color in the vector image, finding the centers of masses of the identified two shapes, classifying the identified two shapes as a shape pair if a straight line connecting the centers of mass does not intersect any other shape in the vector image and a ratio between a length of a first one of the two shapes to the length of a second one of the two shapes is within a predetermined range, and the length of the connecting straight line is less than or equal to the predefined distance.

10. The method of claim 9, where in the ratio is determined based on a shape length taken as the length of the shape orthogonal to the connecting straight line.

11. The method of claim 1, wherein the step of identifying chains of shapes comprises:
   representing the shapes of a same color as a shape graph, each shape graph having a connecting line between the centers of mass of two shapes so long as the connecting line does not cross over any additional shapes of the same color, wherein each shape is considered a vertex in the shape graph and each connecting line between two centers of mass is considered an edge in the shape graph;
   generating graph configurations by selectively including or not including various edges in the shape graph;
   for each graph configuration, eliminating the graph configuration if any vertex in the graph configuration is connecting to more than one other vertex, and calculating a graph configuration energy based on a length of the a chain defined by the graph, a variance in shape height, and curvature of the chain, and selecting one or more of the graph configurations having a minimized chain energy as a respective potential text candidate.

12. The method of claim 1, wherein the characteristic lines associated with an identified chain correspond to curvature of the identified chain and comprise at least a center line and a first line equidistant from the center line on one side of the center line and a second line equidistant from the center line on the opposite side of the center line; and wherein the step of straightening the identified chains comprises:
   for each shape in an identified chain, finding a bounding box around the shape such that the boundaries of the box in a first dimension touch the first line and the second line and the boundaries of the box in a second dimension touch at least one point on the shape but does not cross over into the shape, determining an angle between a normal line and a horizontal normal line, the normal line taken between the center of mass of the shape and the center line, and the horizontal normal line being a normal line for a horizontal line, and rotating the shape by the determined angle; and
   normalizing the identified chain such that the distance between the first line and second line is equal to a predetermined value.

13. The method of claim 1, wherein the classifying step comprises:
   Passing each straightened identified chain to a text classifier that is trained with a training data set to distinguish text from non-text chains.

14. The method of claim 13, wherein the text classifier is implemented using an artificial neural network.

15. A text classification system comprising:
   one or more processors configured to receive a raster image;
   a raster-to-vector converter which converts the raster image into a vector image comprising a vector representation of the received raster image;
   a shape pair detection engine which identifies pairs of shapes of similar size and within a predefined distance of one another;
   a chain detection system which forms shape graphs from the identified shape pairs and identifies chains of shapes from the formed shape graphs;
   a chain line straightening system which determines characteristic chain lines associated with the identified chains of shapes and which straightens the identified chains into a straight line based on the corresponding chain lines associated with the respective identified chains of shapes; and
   a text classifier which classifies the straightened identified chains as text or non-text.

16. The text classification system of claim 15, wherein the raster-to-vector converter is configured to receive the raster image, convert the received raster image into a color-reduced raster image, and convert the color-reduced raster image to generate a colorized vector image.

17. The text classification system of claim 16, wherein the raster-to-vector converter is configured to down-sample the received raster image to a reduced set of discrete colors to generate the color-reduced raster image.

18. The text classification system of claim 16, wherein the raster-to-vector converter is configured to set corresponding pixel colors of pixels in the received raster image to a nearest color in a predetermined reduced set of discrete colors to generate the color-reduced raster image.

19. The text classification system of claim 16, wherein the raster-to-vector converter is configured to apply an Octree color quantization algorithm to the received raster image to generate a down-sampled version of the received raster image having pixels corresponding only to a reduced set of discrete colors to thereby generate the color-reduced raster image.

20. The text classification system of claim 16, wherein the raster-to-vector converter is configured to apply a Median Cut color quantization algorithm to the received raster image to generate a down-sampled version of the received raster image having pixels corresponding only to a reduced set of discrete colors to thereby generate the color-reduced raster image.

21. The text classification system of claim 16, wherein the raster-to-vector converter is configured to decompose the color-reduced image into separate bi-color planes and to vectorize each bi-color plane to generate the vector image.

22. The text classification system of claim 21, wherein the shape pair detection engine is configured to identify two shapes of the same color in the vector image, find the centers of masses of the identified two shapes, classifying the identified two shapes as a shape pair if a straight line connecting the centers of mass does not intersect any other shape in the vector image and a ratio between a length of a first one of the two shapes to the length of a second one of the two shapes is within a predetermined range, and the length of the connecting straight line is less than or equal to the predefined distance.

23. The text classification system of claim 22, where in the ratio is determined based on a shape length taken as the length of the shape orthogonal to the connecting straight line.

24. The text classification system of claim 15, wherein the chain detection system comprises a shape graph generator, the shape graph generator configured to generate one or more respective shape graphs each associated with a different one of the reduced set of discrete colors, each shape graph representing the shapes of a color corresponding to the associated shape graph, each shape graph having a connecting line between the centers of mass of two shapes so long as the connecting line does not cross over any additional shapes of the same color, wherein shapes are vertexes in the shape graph and each connecting line between two centers of mass is considered an edge in the shape graph, the shape graph generator configured to generate graph configurations by selectively including or not including various edges in the shape graph, the shape graph generator further configured to, for each graph configuration, eliminate the graph configuration if any vertex in the graph configuration is connecting to more than one other vertex, calculate a graph configuration energy based on a length of the a chain defined by the graph, a variance in shape height, and curvature of the chain, and select one or more of the graph configurations having a minimized chain energy as a respective potential text candidate.

25. The text classification system of claim 15, wherein:

the chain line straightening system is configured to determine characteristic lines associated with an identified chain, the characteristic lines corresponding to curvature of the identified chain and comprising at least a center line and a first line equidistant from the center line on one side of the center line and a second line equidistant from the center line on the opposite side of the center line;

the chain line straightening system;

the chain line straightening system further configured to adjust the rotation of shapes in the chain based on the determined characteristic lines and to normalize the position of the shapes to lie along a straight line.

26. The text classification system of claim 15, wherein the text classifier comprises an artificial neural network which is trained with a training data set to distinguish text from non-text chains.

* * * * *